Figure 6:
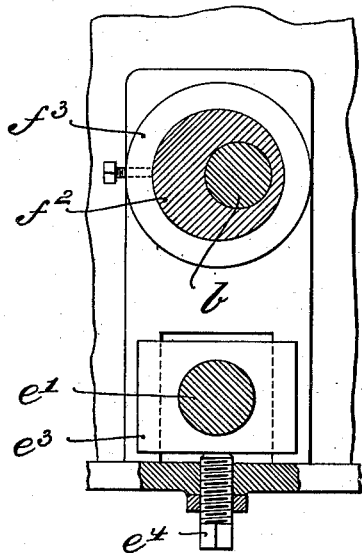

No. 664,379. Patented Dec. 25, 1900.
E. S. BRADFORD.
MACHINE FOR MAKING EXPANDED METAL.
(Application filed Sept. 5, 1899.)
(No Model.) 6 Sheets—Sheet 1.
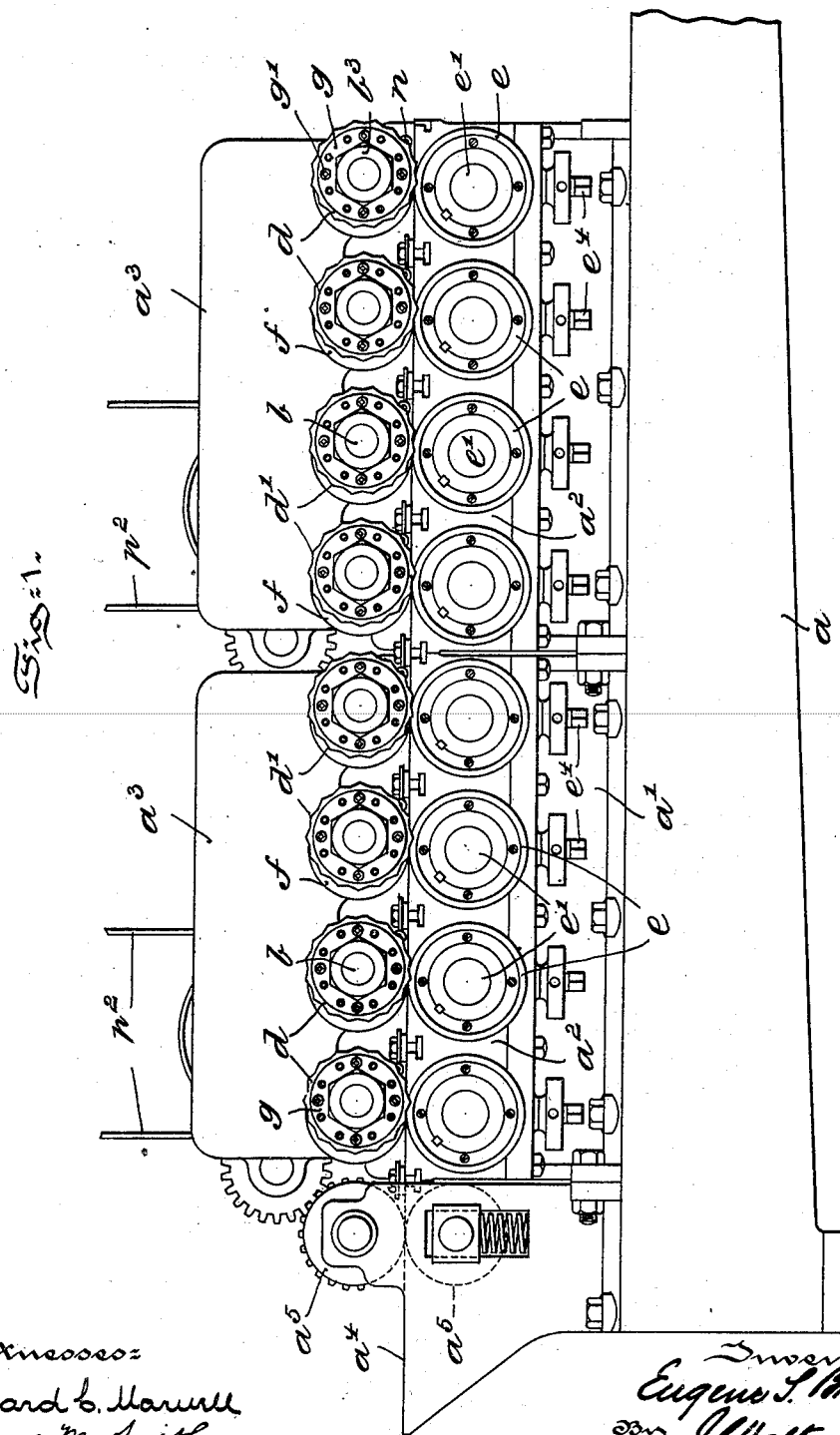
Witnesses:
Richard C. Maxwell
Thomas M. Smith
Inventor:
Eugene S. Bradford,
By J. Walter Douglass
Attorney No. 664,379. Patented Dec. 25, 1900.
E. S. BRADFORD.
MACHINE FOR MAKING EXPANDED METAL.
(Application filed Sept. 5, 1899.)
(No Model.) 6 Sheets—Sheet 2.
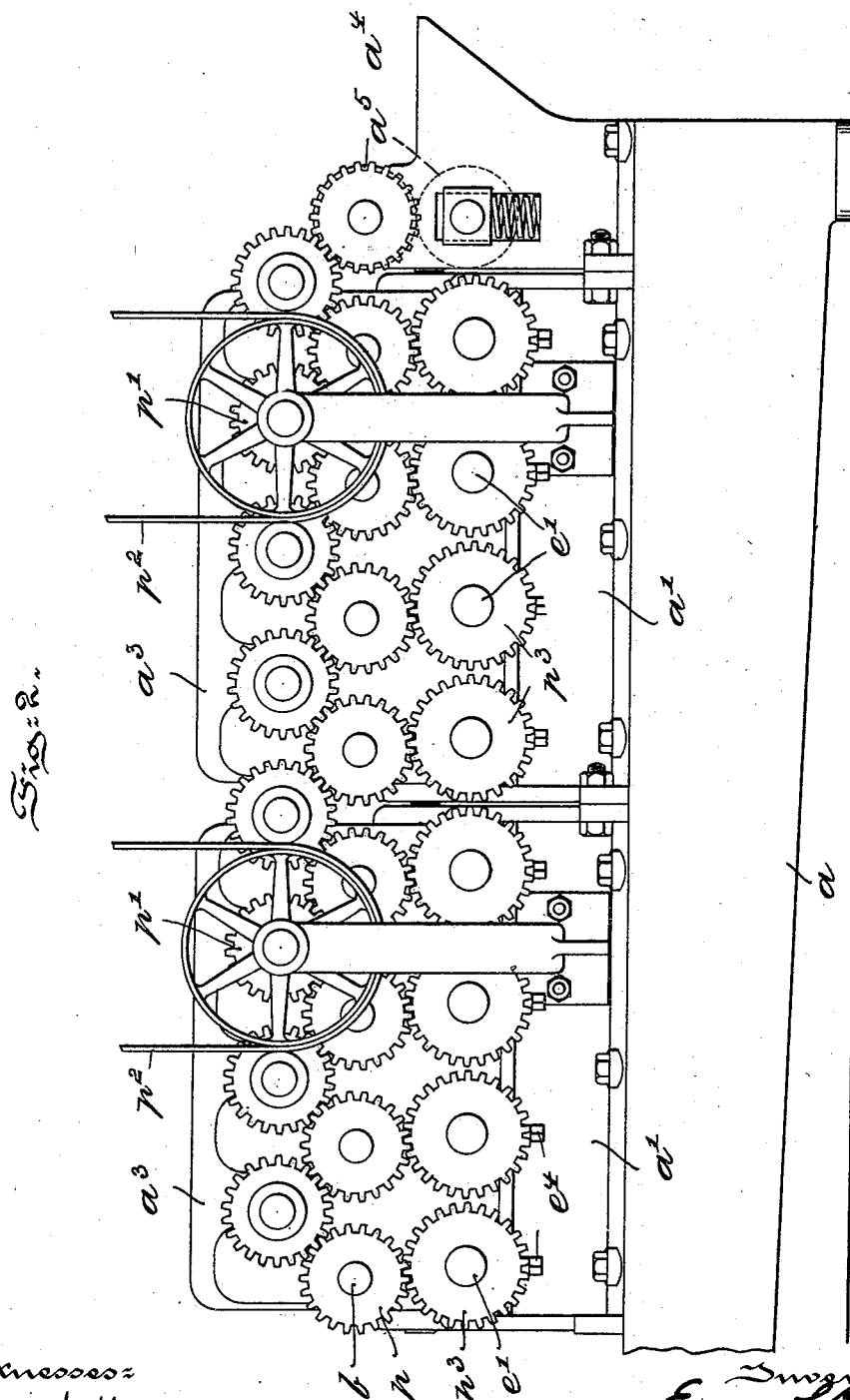

No. 664,379. Patented Dec. 25, 1900.
E. S. BRADFORD.
MACHINE FOR MAKING EXPANDED METAL.
(Application filed Sept. 5, 1899.)
(No Model.) 6 Sheets—Sheet 3.
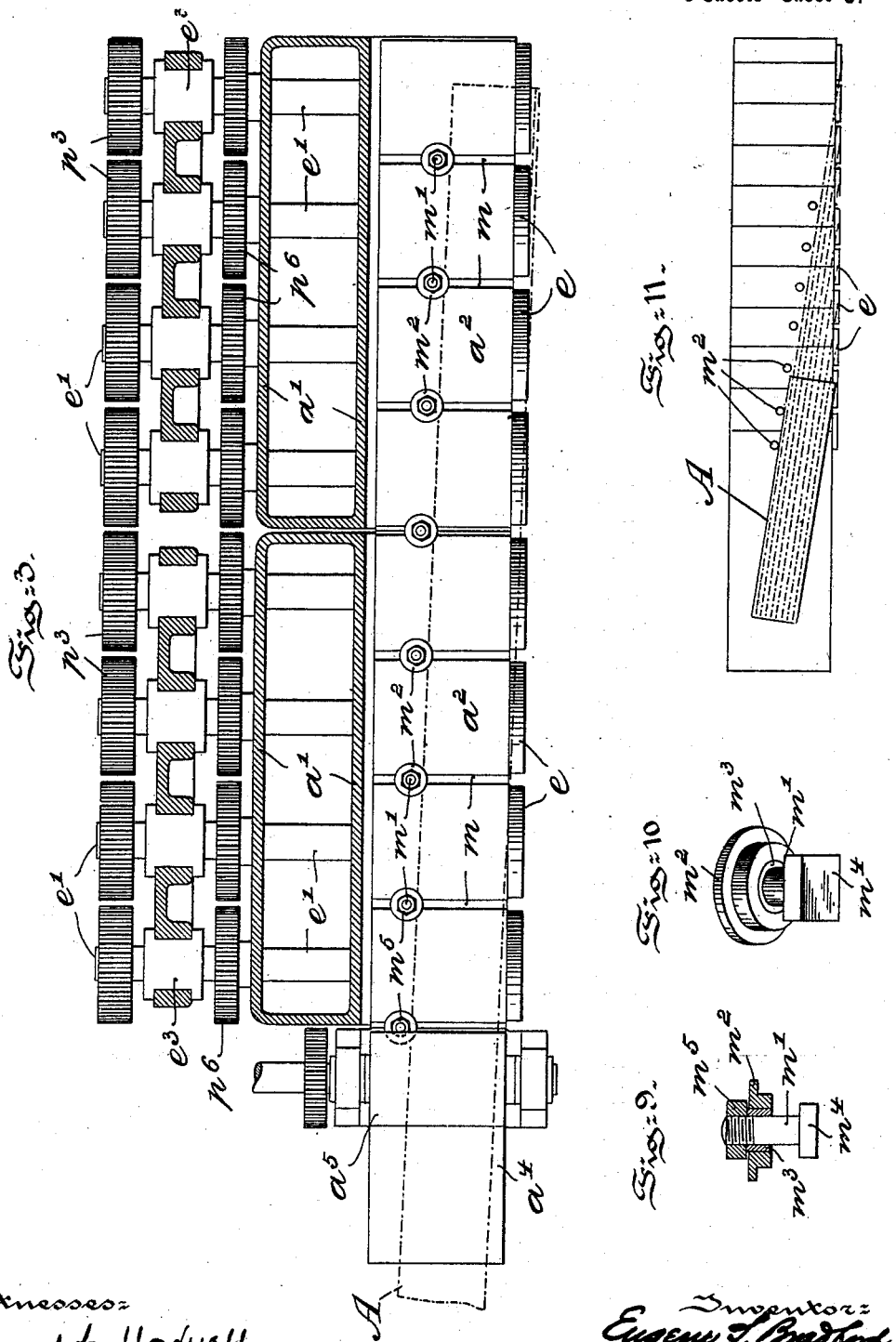

No. 664,379. Patented Dec. 25, 1900.
E. S. BRADFORD.
MACHINE FOR MAKING EXPANDED METAL.
(Application filed Sept. 5, 1899.)
(No Model.) 6 Sheets—Sheet 4.
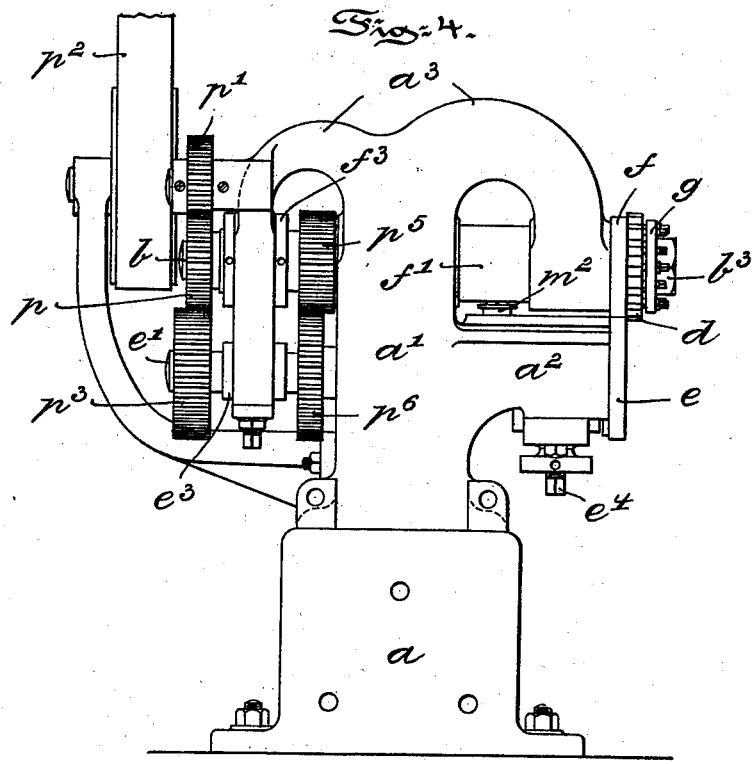
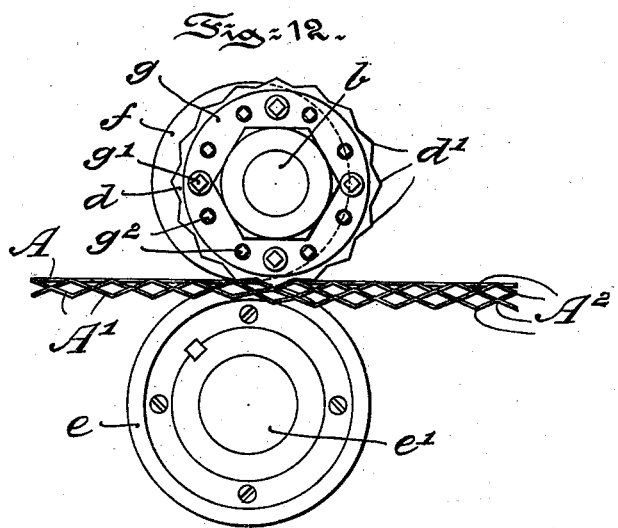

No. 664,379. Patented Dec. 25, 1900.
E. S. BRADFORD.
MACHINE FOR MAKING EXPANDED METAL.
(Application filed Sept. 5, 1899.)
(No Model.) 6 Sheets—Sheet 5.
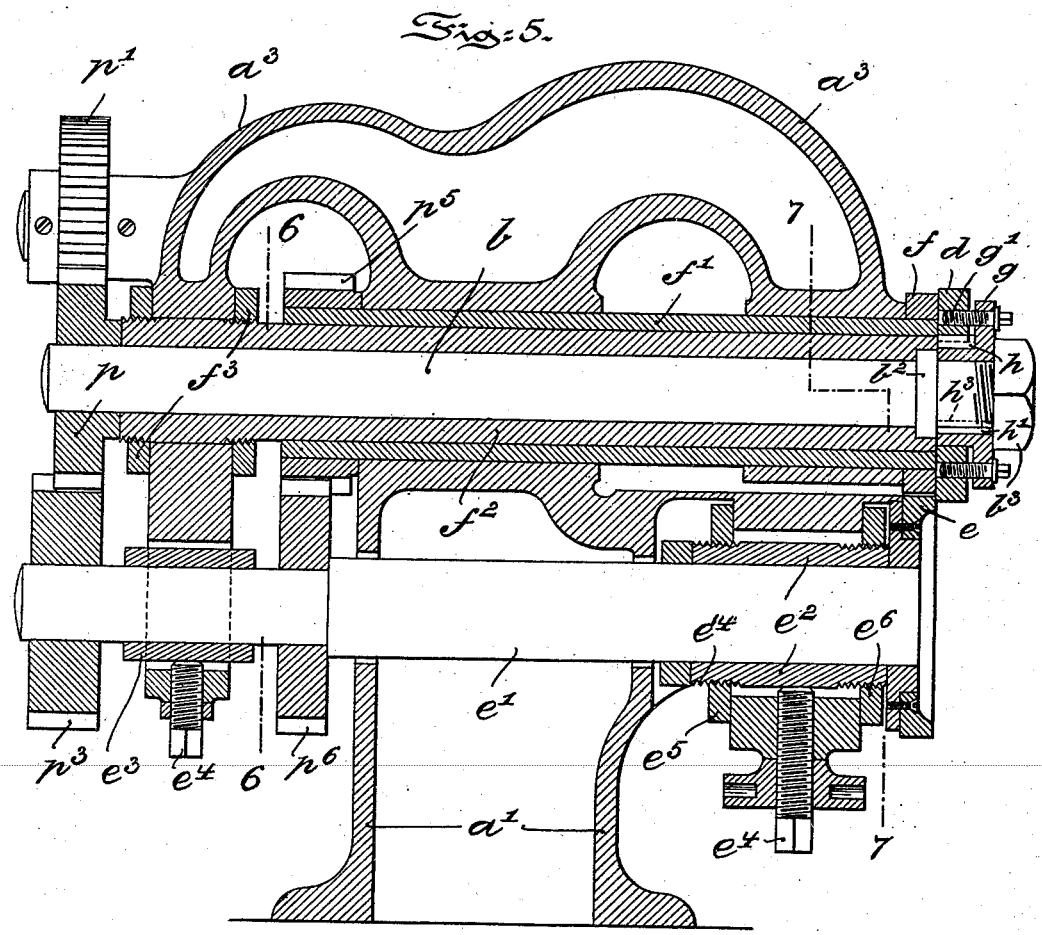
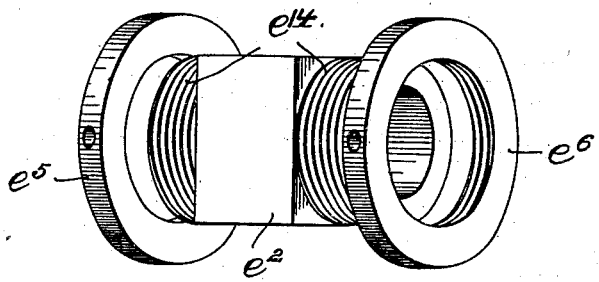

No. 664,379. Patented Dec. 25, 1900.
E. S. BRADFORD.
MACHINE FOR MAKING EXPANDED METAL.
(Application filed Sept. 5, 1899.)

(No Model.) 6 Sheets—Sheet 6.

UNITED STATES PATENT OFFICE.

EUGENE S. BRADFORD, OF PHILADELPHIA, PENNSYLVANIA.

MACHINE FOR MAKING EXPANDED METAL.

SPECIFICATION forming part of Letters Patent No. 664,379, dated December 25, 1900.

Application filed September 5, 1899. Serial No. 729,423. (No model.)

*To all whom it may concern:*

Be it known that I, EUGENE S. BRADFORD, a citizen of the United States, residing at the city of Philadelphia, in the county of Philadelphia and State of Pennsylvania, have invented certain new and useful Improvements in Machines for Making Expanded Metal, of which the following is a specification.

My invention has relation to a machine adapted to form sheet metal into a reticulated or mesh-like structure, and in such connection it relates more particularly to the construction and arrangement of such a machine.

Heretofore in machines used for a similar purpose the sheet metal has been slit and expanded into the form desired either by subjecting it to the action of two converging series of rotary cutters and expanders or to the action of reciprocating knives.

The machine of my present invention differs essentially from preceding machines in that but a single series of rotary cutters and expanders is required, the metal being fed to these cutters or expanders at an angle.

The principal object of my invention is therefore to provide a machine for expanding metal, having but a single series of rotary expanding-cutters arranged in alinement, the sheet of metal being fed to these cutters at an angle to the plane in which the cutters rotate.

Further objects of my present invention are, first, to provide, in conjunction with the single series of expanding-cutters, a series of circular cutters, replacing the stationary or reciprocatory knives formerly used; second, to locate these circular cutters slightly in advance of the expanding-cutters, so that the circular cutter may act as a support for the metal during the shearing and expanding operations; third, to provide, in conjunction with the expanding-cutters and circular cutters, a feed-roller located eccentrically with respect to the shaft of each expanding-cutter, so as to be directly above the circular cutter and to assist said circular cutter in the feeding of the sheet; fourth, to provide each expanding-cutter with a holder which can be readily and quickly secured or removed from the shaft of the expanding-cutter by means of a single nut and to which holder the expanding-cutter is firmly secured; fifth, to provide set and binding screws by means of which the expanding-cutter may be adjusted on its holder toward or away from the face of the circular cutter; sixth, to provide an expanding-cutter, its shaft, and the holder for securing the cutter to said shaft with splines or keys, whereby the cutter when removed from the shaft may be replaced thereon to occupy the same relative position with respect to its expanding-prongs as it did prior to its removal from the shaft; seventh, to provide in such a machine a bed or table over which the metal is fed, said bed being provided with a series of transverse slots, wherein guide-rolls are adapted to be adjusted, said guide-rolls determining the relative angle at which the metal is to be presented to the cutters; eighth, to provide in such a machine means whereby the expanding-cutters and their shafts may be arranged eccentrically with respect to the feed-rollers on said shafts, so as to permit the feed-rollers to rotate directly above the lower circular cutters and the expanding-cutters to rotate a little beyond the circular cutters; ninth, to provide means for adjusting the shafts of the lower set of cutters transversely and vertically in the machine with respect to the frame, so as to compensate for wear and tear upon the cutters, as well as permit sheets of varying thickness to be cut, and, tenth, to provide adjacent to and in the rear of each expanding-cutter a stripping-roll adapted to prevent the expanded metal from buckling upward in the machine.

My invention, stated in general terms, consists of a machine for expanding metal constructed and arranged in substantially the manner hereinafter described and claimed.

The nature and scope of my invention will be more fully understood from the following description, taken in connection with the accompanying drawings, forming part hereof, in which—

Figure 7:
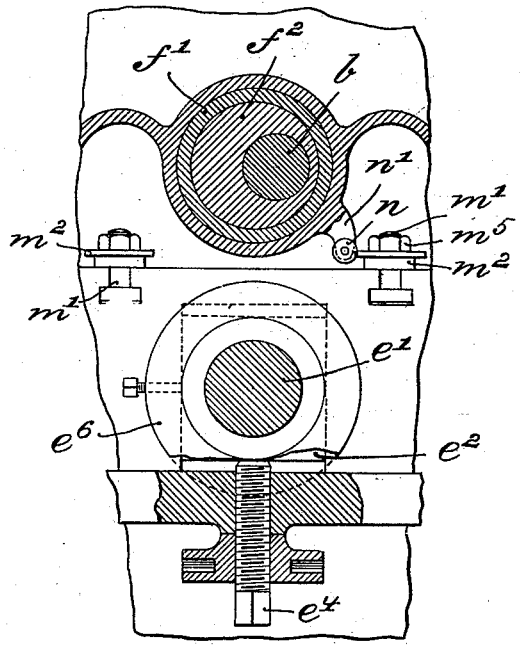
Figure 8:
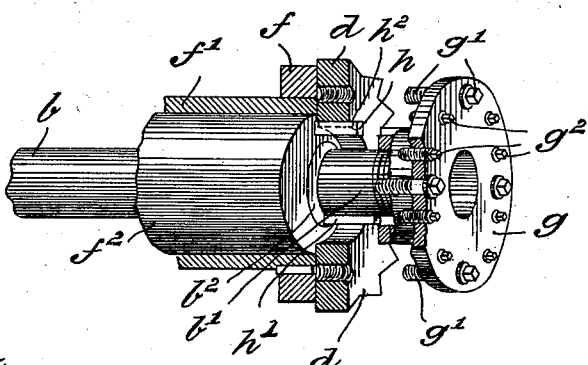

Figure 1 is a front elevational view of a machine embodying the main features of my invention. Fig. 2 is a rear elevational view of the same. Fig. 3 is a horizontal sectional view taken on a plane directly above the lower or circular cutters. Fig. 4 is an elevational view of the feeding end of the machine, a part of the feeding-table being removed. Fig. 5 is an enlarged transverse sectional view of Fig. 4. Fig. 6 is a vertical sectional view on the line 6 6 of Fig. 5. Fig. 7 is a similar view on the line 7 7 of Fig. 5. Fig. 8 is an enlarged perspective view, sectioned and partly broken away, of the expanding-cutter, its holder, and auxiliary parts. Figs. 9 and 10 are detail views illustrating the construction and arrangement of one of the guide-rolls. Fig. 11 is a diagrammatic view illustrating the manner in which the sheet metal is presented to the cutters. Fig. 12 is a front elevational view of the expanding-cutter and the circular cutter, illustrating the manner in which the meshes are formed in the sheet; and Fig. 13 is a perspective detail view of the adjustable bearing-block for the shaft of one of the lower or circular cutters.

Referring to the drawings, $a$ represents the base or support of the machine, upon which is supported the vertical frame $a'$, in which the various shafts of the machine are supported. From the vertical frame $a'$ projects the lateral extension $a^2$, which forms the feeding-bed of the machine. From the top of the vertical frame $a'$ extends an arched framework $a^3$, which forms an auxiliary support for the shafts $b$ and accessories carrying the expanding-cutters $d$. The expanding-cutters $d$ are all arranged in alinement at the front of the machine, as illustrated in Figs. 1 and 4, and the sheet of metal A is fed from a feeding-table $a^4$ by means of two feed-rolls $a^5$ to the feeding-bed $a^2$ and is presented to the action of the expanding-cutters $d$ at an angle more or less acute, as desired.

In Fig. 11 the feeding of the sheet A to the cutters is illustrated in diagram. In conjunction with the expanding-cutters $d$ at the front of the machine is located a series of circular cutters $e$, having their shafts $e'$ arranged below the feeding-bed $a^2$ slightly in advance of the shafts $b$, carrying the expanding-cutters $d$, as clearly illustrated in Figs. 1, 6, 7, and 12. The periphery of each cutter $e$ thus serves as a support for the sheet during the expanding and shearing of the same by the expanding-cutters $d$.

The cutting and expanding of the metal is accomplished in the following manner: The expanding-cutter $d$ is in the form of a star having expanding-prongs $d'$. The inner face of each prong acting in conjunction with the outer face of each circular cutter $e$ serves to shear or slit the sheet A. The prongs $d'$ then expand the portion slit to form the meshes A', as clearly illustrated in Fig. 12. In conjunction with the periphery of each circular cutter the metal is supported or clamped and continuously fed by a feed-roller $f$, which rotates eccentrically with respect to the shaft $b$ of each expanding-cutter $d$ and directly above the periphery of each circular cutter $e$. The axes of the feed-rollers $f$ and expanding-cutters $d$ all lie in the same horizontal plane; but by reason of the eccentric relationship of each feed-roller to a shaft $b$ of a corresponding expanding-cutter the feed-rollers rotate slightly in the rear of the expanding-cutters.

The preferred manner of arranging the feed-roller $f$ with respect to the shaft $b$ is illustrated in detail in Figs. 5, 6, 7, and 8 and is as follows: The frames $a'$ and $a^3$ have tubular bearings, in which is adapted to rotate a sleeve $f'$, carrying the feed-roller $f$. Within the sleeve $f'$ is located a fixed cylindrical block $f^2$, upon which the sleeve $f'$ is designed to rotate and within which is located eccentrically the shaft $b$, which rotates upon the block $f^2$ as a bearing. The block $f^2$ is clamped, by means of collars $f^3 f^3$, to a portion of the arched frame $a^3$, so as to prevent its turning in said frame. The expanding-cutter $d$ is preferably not secured directly to the shaft $b$, but is carried by a holder or cap $g$. This cap $g$ has a central orifice and is adapted to slip over the projecting screw-threaded end $b'$ of the shaft $b$ until it fits against a collar $b^2$ of said shaft. A nut $b^3$ serves to clamp the cap $g$ down upon the collar, as clearly illustrated in Figs. 5 and 8.

The star-cutter $d$ is secured to the cap or holder $g$ in the following preferred manner: A series of set-screws $g^2$ are adapted to advance the cutter $d$ from the cap $g$ toward the lower or circular cutter $e$ until the inner periphery of the expanding-cutter $d$ is at the prescribed distance away from the outer periphery of the lower or circular cutter $e$ to permit of a clear shearing or cutting of the sheet. A series of binding-screws $g'$ serve to lock the expanding-cutter $d$ against the force of the set-screws $g^2$, and thus prevent accidental loosening of said expanding-cutter $d$.

In arranging the star or expanding cutters $d$ in alinement, as illustrated in Fig. 1, the prongs $d'$ of the various cutters do not occupy the same relative position with respect to the axis of the lower cutters $e$. Thus, beginning at the left of Fig. 1, it will be observed that the first cutter $d$ has its expanding-prong $d'$ slightly in the rear of the axis of its complemental lower cutter $e$, whereas the next expanding-cutter $d$ is turned so that its prong $d'$ is almost directly in line with said axis. This alternate arrangement is followed throughout the series of expanding-cutters $d$. The reason for this arrangement is obvious. In the formation of the meshes A' in the sheet A each alternate row of half-meshes (see Fig. 12) is cut by alternate cutters $d$, and the points $A^2$ of expansion of the meshes A' will therefore not be in the same line in adjacent rows, but will fall in the same line in alternate rows. This results in the formation of diamond-shaped meshes, as clearly illustrated in Fig. 12. When now for any reason a star or expanding cutter $d$ is to be removed from its shaft $b$ and then replaced, it is necessary that when replaced its prongs shall occupy the same relative position as they did prior to the removal of the cutter from its shaft. A simple and efficient means for accomplishing this is illustrated in Figs. 5 and 8 and consists in preferably supplying the cap or holder $g$ with two keys $h$ and $h'$, one of which, $h$, is adapted to enter a keyway $h^2$, formed in the cutter $d$, and the other, $h'$, is adapted to enter a keyway $h^3$ in the shaft $b$.

Referring now to Figs. 3, 9, and 10, the preferred manner of guiding the sheet A on the bed $a^2$ is illustrated. In the bed $a^2$ is formed a series of transverse slots $m$, in which are adapted to slide the bolts $m'$, each carrying at its upper end a flanged roll $m^2$, adapted, preferably, to turn upon a washer or sleeve $m^3$, surrounding the body of the bolt and interposed between its head $m^4$ and the clamping-nut $m^5$. The bolts $m'$, with their guide-rolls $m^2$, are slid in the slots $m$ until they are alined along the bed at the requisite angle to the edge of the bed $a^2$, and then they are clamped by the nuts $m^5$ and heads $m^4$, so as to prevent movement in the slots. It is to be understood that by shifting the bolts and guide-rolls along the slots the line of guide-rolls may be changed to make a more or less acute angle with the line of cutters $d$ and $e$ than the angle shown in the drawings.

In machines of this type the wear and tear upon the revolving cutters must be compensated for, and for this purpose the shafts $e'$ are arranged in boxes $e^2$ and $e^3$, adapted to slide in bearings and to be adjusted up and down in said bearings by means of set-screws $e^4$. A preferred form of box is illustrated in Fig. 13, and its arrangement in the machine is shown at Fig. 5. To compensate for different thickness of metal to be cut and expanded, the cutters $e$ and $d$ should be adapted to be brought into more or less close relationship with each other, according to the thickness of the sheet. One way of accomplishing this is to give either shaft $b$ or $e'$ a transverse movement in the frame of the machine. In Fig. 5 the lower shaft $e'$ is adapted to be thus shifted, and for this purpose one of the boxes $e^2$ is screw-threaded, as at $e^{14}$, to receive the collars $e^5$ and $e^6$, which when advanced on the box will serve to clamp the box to its bearing and when retracted will permit of the shifting of said shaft and box slightly in the bearing to occupy a required position, when the collars may again be tightened and the box locked in its new position. In the cutting and expanding of the sheet by means of an upper and lower rotary cutter the metal has a tendency to buckle upward in the machine. To prevent this and to assist in stripping the metal from the prongs of the expanding-cutters $d$, there is provided at the rear of each cutter $d$ a stripping-roll $n$, suspended from the frame $a^3$ and rotating in a bracket $n'$ in said frame. To properly feed and operate upon the metal, it is necessary that the star or expanding cutters $d$, the lower or circular cutters $e$, and the feed-rollers $f$ shall all rotate in the same direction and at the same speed. To accomplish this, there is secured, as illustrated in Figs. 2 and 5, upon each shaft $b$ a gear-wheel $p$, meshing with a drive gear-wheel $p'$, to which motion is conveyed in any suitable manner from a source of power (not shown) by means of belts $p^2$. The gear-wheel $p$ on shaft $b$ meshes with a similar gear-wheel $p^3$ on the shaft $e'$. Motion is conveyed to the sleeve $f'$, carrying the feed-rollers $f$, by securing a gear-wheel $p^5$ on said sleeve and meshing said gear-wheel $p^5$ with a similar gear-wheel $p^6$, carried by the shaft $e'$, all as clearly illustrated in Fig. 5.

Having thus described the nature and objects of my invention, what I claim as new, and desire to secure by Letters Patent, is—

1. In a machine for expanding metal, a single series of rotary expanding-cutters arranged in alinement and means for feeding the metal at an angle to the plane in which said cutters rotate, substantially as and for the purposes described.

2. In a machine for expanding metal, a single series of rotary expanding-cutters arranged in alinement, a series of rotary circular cutters arranged below and coacting with the expanding-cutters, and means for feeding the metal at an angle to the plane in which the coacting cutters rotate, substantially as and for the purposes described.

3. In a machine for expanding metal, a single series of rotary expanding-cutters arranged in alinement and a series of rotary circular cutters arranged below and coacting with the expanding-cutters, the axes of said circular cutters being arranged slightly in advance of the axes of the expanding-cutters, substantially as and for the purposes described.

4. In a machine of the character described, a single series of rotary expanding-cutters arranged in alinement, a series of rotary circular cutters arranged below and coacting with the expanding-cutters, the axes of said circular cutters being arranged in advance of the axes of the expanding-cutters, and a series of feed-rollers arranged eccentrically on the axes of the expanding-cutters directly above the circular cutters and having their axes of rotation in line with the axes of rotation of the lower circular cutters, substantially as and for the purposes described.

5. In a machine of the character described, a cutter having a series of expanding-prongs, a cap or holder for said cutter, a series of binding-screws adapted to secure the cutter to the cap or holder, and a series of set-screws adapted to bear against the cutter to lock the same and to prevent accidental loosening of said cutter, substantially as and for the purposes described.

6. In a machine of the character described, an expanding-cutter, a shaft and a cap or holder for said cutter, said cap being provided with two keys, one of which is adapted to secure the cutter to the holder and the other to secure the holder to the shaft, substantially as and for the purposes described.

7. In a machine of the character described, a single series of rotary expanding-cutters arranged in alinement, a feeding-bed above which the expanding-cutters rotate and provided with a series of transverse slots, a single series of rotary circular cutters arranged below and coacting with the expanding-cutters, and a series of guide-rolls adapted to be adjusted in the slots of the bed, to constitute a means for feeding the metal at an angle to the plane in which the coacting cutters rotate, substantially as and for the purposes described.

8. In a machine of the character described, an expanding-cutter, a shaft carrying said cutter, a cylindrical bearing-block in which said shaft is eccentrically located, a sleeve adapted to rotate upon the exterior of said block, and a feed-roller carried by said sleeve, substantially as and for the purposes described.

9. In a machine of the character described, a single series of expanding-cutters and their shafts, a single series of circular cutters coacting with said expanding-cutters and having their shafts arranged below the expanding-cutters and shafts, means for feeding the metal in the direction of rotation of said coacting cutters and means for feeding said metal at an angle to the plane of rotation of said coacting cutters, substantially as and for the purposes described.

In testimony whereof I have hereunto set my signature in the presence of two subscribing witnesses.

EUGENE S. BRADFORD.

Witnesses:
J. WALTER DOUGLASS,
THOMAS M. SMITH.